United States Patent [19]
Dali et al.

[11] 3,825,333
[45] July 23, 1974

[54] SHROUD STRUCTURE FOR A MICROFILM READER

[75] Inventors: George J. Dali, Rochester; William E. White, Hilton, both of N.Y.

[73] Assignee: Eastman Kodak Company, Rochester, N.Y.

[22] Filed: Feb. 7, 1972

[21] Appl. No.: 223,941

[52] U.S. Cl............................... 353/75, 312/7 TV
[51] Int. Cl..................... G03b 21/10, G03b 21/30, G03b 21/58
[58] Field of Search............................. 353/25–27, 353/74–78, 119, 97; 312/7 TV

[56] References Cited
UNITED STATES PATENTS
2,617,328   11/1952   Stableford............................. 353/75
FOREIGN PATENTS OR APPLICATIONS
660,821   11/1951   Great Britain........................ 353/75
828,019   2/1968   Great Britain..................... 312/7 TV Primary Examiner—Louis R. Prince
Assistant Examiner—A. Jason Mirabito
Attorney, Agent, or Firm—L. F. Seebach

[57] ABSTRACT

A shroud structure for a microfilm reader comprises two movable members, each of which is pivotally mounted on the reader housing adjacent a respective opposite edge of the viewing opening. Each member is interconnected to the other so as to be movable as a unit between a first and second position. In the first position, the shroud members cover the viewing opening and in a second position they form an extension and provide a shroud opening that is of maximal size. Since the two members are interconnected and movable as a unit, the extension of the members provides an opening that increases to a maximum size in the second position. Any number of intermediate positions are possible depending on the amount or the distance the shroud members have been extended. Hence, in any position of the shroud members, the amount of ambient light incident on the screen can be controlled.

1 Claim, 3 Drawing Figures

3,825,333

SHROUD STRUCTURE FOR A MICROFILM READER

FIELD OF THE INVENTION

The present invention relates to a reader for microfilm and, more particularly, to a shroud structure for such reader to prevent incidence of ambient light on the viewing screen and to provide a viewing opening that can be adjusted by the viewer to the size necessary in accordance with the viewing angle and the prevailing light conditions.

DESCRIPTION OF THE PRIOR ART

Normally, a microfilm reader is provided with a viewing screen that is generally flush with a front surface of the housing which contains the optics and the film strip or sheet of film which carries the images to be viewed. With such positioning of the screen, the ambient light presents a problem in that when incident on the screen the image that is projected on the screen for viewing is reduced considerably in contrast and brightness, thereby making it very difficult for the viewer to read and analyze the subject matter comprising the image. In some instances, an opening is provided in the housing through which a screen mounted within the housing can be viewed. In this case, a member is provided that is movable into a position relative to the opening such that some of the light, particularly ambient light, that might otherwise be incident on the screen is prevented from reaching the screen or entering the viewing opening. Normally, this member is extendable from one side of the opening, usually the upper side, to prevent the overhead ambient light from reaching the screen. In other cases, attempts have been made to eliminate any ambient light that might be incident on the screen from the sides, but in this case the members are usually hinged or fixed to the housing in such a way that they cannot be adjusted to present a viewing opening the size of which can be varied in accordance with the viewing angle and the ambient light conditions. When a viewer is normally situated in front of a reader for viewing an image, ambient light will also be reflected from the clothing worn by the viewer particularly if the viewer is wearing white or light colored apparel. Under these conditions, as much light may be reflected from the viewer's apparel onto the screen as may be incident on the screen from the normal overhead or side ambient light.

SUMMARY OF THE INVENTION

It is an object of the invention to provide a shroud structure for a microfilm reader that effectively reduces the ambient light incident on the reader screen, thereby providing an image of increased brightness and contrast.

It is another object of the invention to provide a shroud structure for a microfilm reader which permits the formation of a shroud opening of variable size through which the projected image can be viewed, the size being adjustable in one dimension in accordance with the ambient light conditions and the viewing angle.

It is still another object of the invention to provide a shroud structure for a microfilm reader in which the image projected on the screen can be viewed with a minimal reduction in brightness and contrast.

It is yet another object of the invention to provide a shroud structure for a microfilm reader which comprises two interconnected members such that movement of one also effects movement of the other and which provide an extension having an effective opening one dimension of which can be varied in accordance with the ambient light conditions and the viewing angle.

These and other objects and advantages of the invention will be apparent to those skilled in the art from the description of a preferred embodiment of the invention which follows.

The terms "microfilm" and "microfiche" are considered to be synonymous in that both relate to a strip or sheet, respectively, of photographic film having a number of images, a selected one of which is projected onto a screen. Although the film reader about to be described in more detail hereinafter is particularly adapted for handling microfiche (sheet), the invention is applicable to film readers of either type, so the term "microfilm" as used herein is meant to include strip or sheet film having a number of images of reduced size. In the disclosed embodiment of the invention, the microfilm reader comprises a housing in which a viewing opening is provided and in which housing a screen is arranged for having an image projected onto a surface thereof. Even though the screen is mounted within the housing, a certain amount of ambient light might still be incident on the screen due to normal ambient light conditions that exist in the reader environs, as well as ambient light that might be reflected onto the screen from the viewer. In order to reduce the ambient light to a minimal amount so the image projected onto the screen can be viewed with a minimal reduction in brightness and contrast, a shroud structure is provided comprising two movable members, each of which is pivotally mounted on the housing adjacent a respective opposite edge of the viewing opening. Each member is interconnected to the other so as to be movable as a unit between a first and second position. In the first position, the shroud members cover the viewing opening and in a second position they form an extension and provide a shroud opening that is of maximal size. Since the two members are interconnected and movable as a unit, the extension of the members provides an opening that increases to a maximum size in the second position. Any number of intermediate positions are possible depending on the amount or the distance the shroud members have been extended. Each shroud member is generally U-shaped and comprises a cover panel for the viewing opening and side panels that extend from the cover panel. The side panels of the members are contiguous to one another and movable into and out of the housing. As a result, in any extended position, the two members provide an enclosure and form a shroud opening that increases in size as the extension of the members is increased. With such a structure the viewing opening is actually determined by the position of the shroud members and the opening formed thereby that is in alignment with the viewing opening of the housing. Hence, in any position of the shroud members, the amount of ambient light incident on the screen is controlled and in a fully extended position the two members form the shroud opening of maximal size.

DESCRIPTION OF THE DRAWINGS

Reference is now made to the accompanying drawings wherein like reference characters and numerals designate like parts and wherein.

DESCRIPTION OF THE PREFERRED EMBODIMENT

Figure 3:
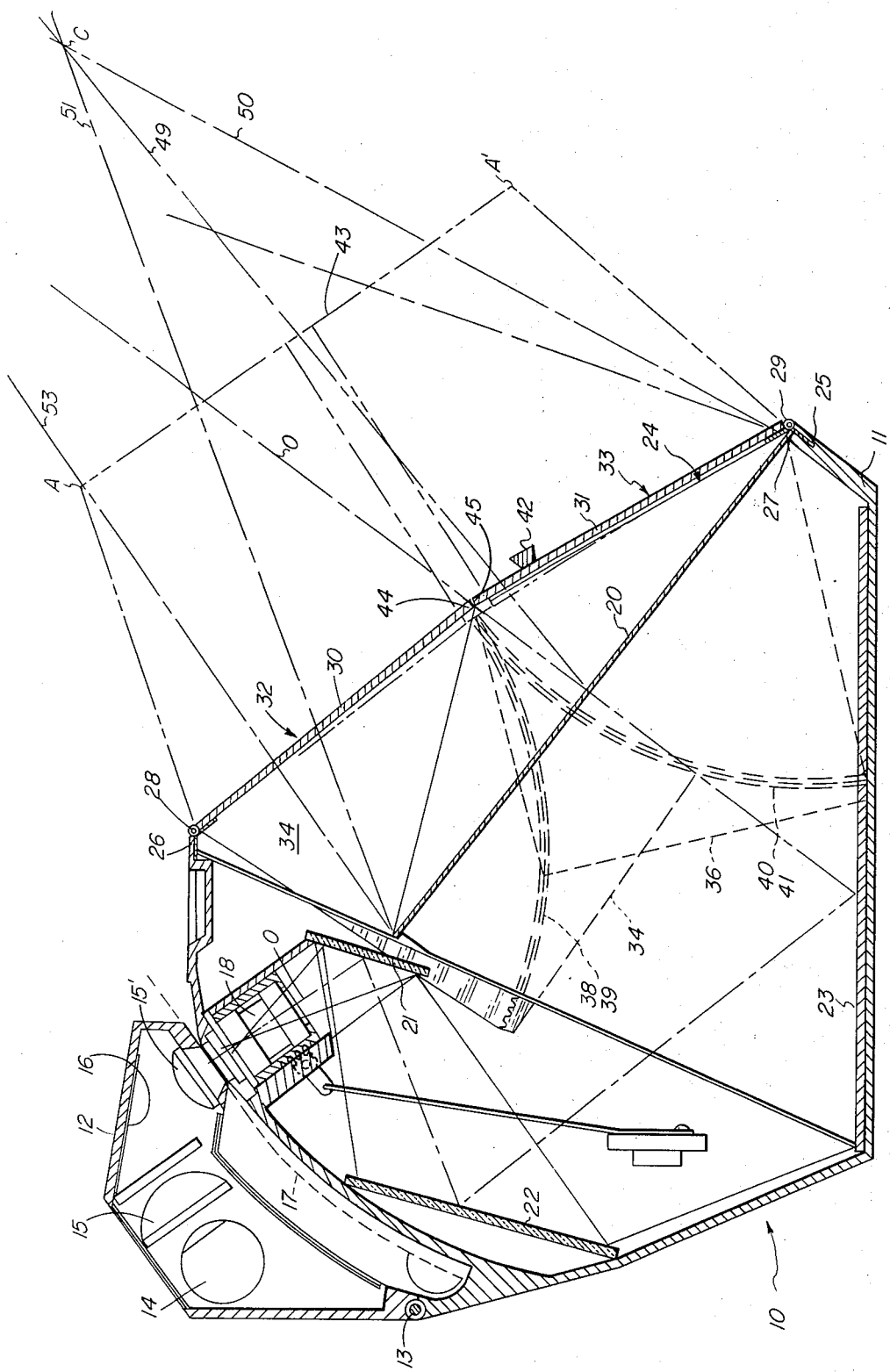
FIG. 3 is a vertical section through the microfilm reader as shown in FIG. 2, showing the relationship of the optical system, the microfiche and the screen to the shroud members in both a closed and a fully extended position, as indicated by broken lines.

With particular reference to FIG. 3 the microfilm reader generally designated by the numeral 10 is similar to that disclosed and described in our copending application, Ser. No. 39,188, filed May 21, 1970 now U.S. Pat. No. 3,720,462. However, a brief description of the elements comprising such microfilm reader will be set forth in order to better understand the function and purpose of the shroud structure comprising the present invention.

Again, with respect to FIG. 3, the microfilm reader 10 comprises a housing 11 and a secondary or lamp housing 12 that is pivotally mounted at 13 on housing 11. The housing 12 contains a light source 14, a condenser lens system 15–15' and a mirror 16 for illuminating a microfiche 17 that is movable relative to the condenser lens system and a projection lens system designated by the numeral 18. The microfiche 17 is movable in the space between the housings 11 and 12 and through the focal plane of the projection lens 18 in a manner as disclosed and described more fully in the aforementioned pending patent application. In any event, the microfiche 17 is arranged in the focal plane between the condenser lens 15' and projection lens 18 and the image thereon that is aligned with the optical axis O is projected onto the rear surface of a screen 20 through a system of mirrors designated by the numerals 21, 22 and 23.

It will be noted that the screen 20 is arranged within the housing 11 and relative to a viewing opening 24 provided in the front wall 25 of housing 11. Along each of the edges 26 and 27 of opening 24, a respective hinge 28 and 29 is mounted. Each of hinges 28 and 29 is also secured to a respective cover panel 30 and 31 of respective shroud members 32 and 33 comprising the shroud structure per se.

Figure 1:
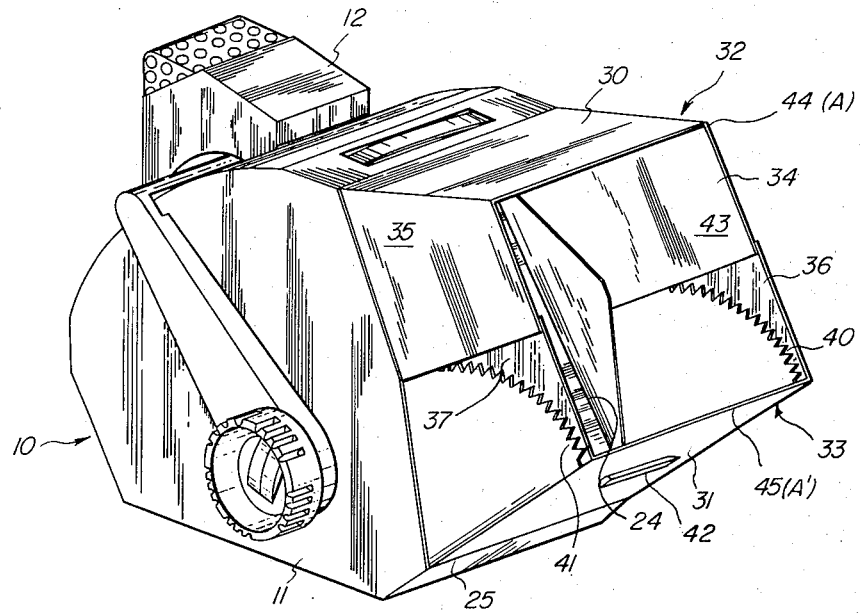
FIG. 1 is a perspective view of a microfilm reader having a shroud structure in accordance with the invention and showing the members comprising the shroud structure in a fully extended position.
Figure 2:
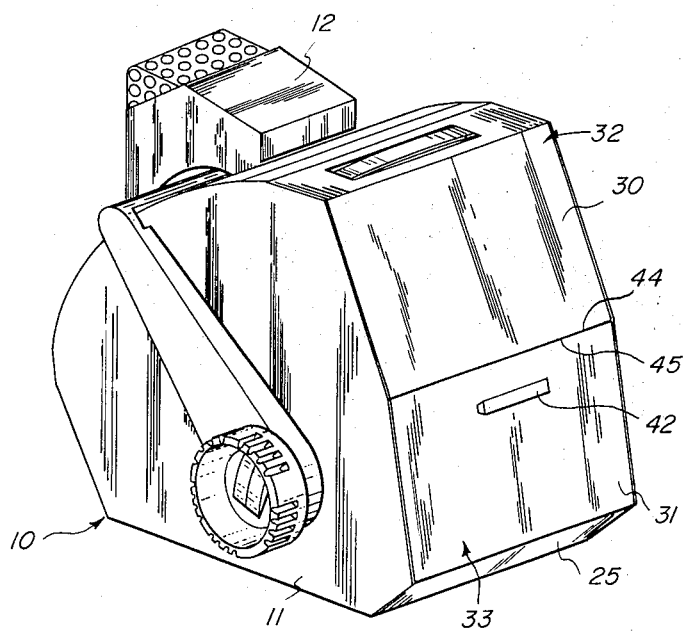
FIG. 2 is a perspective view of the viewer shown in FIG. 1 with the shroud structure in a closed position, the viewing opening being completely covered by the cover panels of the shroud members.

Each of the cover panels 30 and 31 is generally U-shaped in that each panel has side panels 34, 35 and 36, 37, respectively. Each side panel is provided with a gear sector designated by the numerals 38, 39, 40 and 41, respectively. With particular reference to FIG. 1 it will be noticed that the gear sectors 40 and 41 are arranged on opposite faces of their respective panels 36 and 37, that is, sector 40 is on the inner face or surface and sector 41 is on the outer face or surface. Likewise, the gear sectors that are formed with or integral with side panels 34 and 35 will be secured to the outer face or surface of panel 34 and the inner face or surface of panel 35. In this way, the shroud members 32 and 33 can be used interchangeably, that is member 33 can be the upper member, or the lower member, and the only change would be the position of the operating handle 42 which would then be on the upper member rather than the lower member.

Again, referring to FIG. 3 it will be noted that the side panels lie within the housing 11 when the cover panels 30, 31 are in a closed position to completely cover the viewing opening 24 for the screen 20. When the shroud members 32, 33 are moved into a fully extended position, they then assume a position shown in broken lines in FIG. 3, the side panels 34, 36 and 35, 37 overlapping each other so that any ambient light from the sides is effectively blocked from the screen 20. In a fully extended position, as shown in FIGS. 1 and 3, one maximum dimension of the shroud opening 43 is formed by the edges 44, 45 and respective cover panels 30, 31, which are also designated as A, A' as shown in dotted lines. The pair of edges 44, 45 are of fixed length irrespective of the positions assumed by the members 32, 33 relative to the viewing opening 24. The other maximum dimension of the shroud opening 43 is determined by the side plates 34, 36 and 35, 37, these plates forming the other pair of edges of opening 43. Consequently, the size of the shroud opening 43 will vary in one dimension, namely, that determined by the side panels 34, 36 and 35, 37 as the shroud members 32, 33 are moved from a first position in which the cover panels 30 and 31 cover opening 24 and the side panels are completely within housing 12 to a second position in which the side panels are fully extended. In the second position, the cover panels 30, 31 and the side panels form effectively, an extension of housing 12 with the shroud opening 43 then becoming the opening through which the image on the screen is actually viewed.

If the viewer's eyes are placed at a position, such as C in FIG. 3, which is on a line 49 extended from the center of screen 20 and passing through the center of shroud opening 43, when the shroud members 32, 33 are in their fully extended positions, then the opening 43 can be reduced until whichever of A, A' first intersects its respective line 50, 51, the lines 50, 51 representing the limit at which all of screen 20 can be viewed relative to the assumed position C of the viewer's eyes. Accordingly, the shroud opening 43 will be varied in one dimension to a size dependent on the location of point C. As the point C is moved toward screen 20, the opening 43 can be made smaller and smaller in the one dimension. Likewise, as point C is moved away from screen 20, the opening 43 can be made larger until the members 32, 33 are in their fully extended position and opening 43 is maximal in size, substantially as shown in FIG. 3.

When the optical axis O is extended, the maximum distance of point C relative to screen 20 will be determined by the intersection of a line 53 and the axis O. The line 53 is one that defines a limit as determined by the upper edge of the screen 20 and the edge 44 (A) of member 32 when in its fully extended position.

As pointed out hereinabove, the gear sectors 38, 39, 40, 41 are identical in size and so mounted and interconnected that movement of either shroud member will effect movement of the other. In any assumed position of the shroud members 32, 33 intermediate the fully closed (first) and the fully extended (second) positions, the one dimension (horizontal) of opening 43 (edges 44, 45) remains fixed whereas the other dimension (vertical) (panels 34, 36 and 35, 37) varies in accordance with the extension of the members.

It should be readily apparent that in view of the structure of the two shroud members, two very important advantages are obtained with such a structure, namely, the size of the shroud opening can be varied in accordance with the position of the viewer's eye relative to the screen; and secondly, the size of the shroud opening can be varied to control the amount of ambient light incident on the screen. With the ability to control the ambient light, the image brightness and contrast can be greatly enhanced, thereby reducing to a great extent the eye fatigue that is normally brought about with the viewing of images of minimal contrast and brightness.

The invention has been described in detail with particular reference to preferred embodiments thereof, but it will be understood that variations and modifications can be effected within the spirit and scope of the invention.

We claim:

1. In a microfilm reader comprising a housing having a generally rectangular viewing opening, a screen arranged within the housing and viewable through the opening, and an optical system arranged within the housing for projecting onto a surface of the screen a microfilm image that can be observed by a viewer, the improvement which comprises:

a first U-shaped member comprising a first panel and a first pair of spaced side panels with a gear sector mounted on each side panel and having a center of rotation common with its respective member, the first member being pivotally mounted on the housing adjacent an edge of the viewing opening and movable between a closing position in which a portion of the viewing opening is covered by the first panel and the first pair of side panels is within the housing and through intermediate positions to an open position; and a second U-shaped member comprising a second panel and a second pair of spaced side panels with a gear sector mounted on each side panel and having a center of rotation common with its respective member, the second member being pivotally mounted on the housing adjacent another edge of the viewing opening that is opposite the one edge and movable between a closing position in which the other portion of the viewing opening is covered by the second panel and the second pair of side panels is within the housing and through intermediate positions to an open position;

the respective gear sectors on the first and second members engaging one another, whereby movement of one of the first and second members between the closing and open positions is imparted to the other of the members; and the respective side panels of the first and second members being adjacent one another and forming with movement of the first and second members an effective panel extending outward from the housing at each end of the first and second panels, the effective panel and the first and second panels completely surrounding the viewing opening for reducing the ambient light incident on the screen and providing another viewing opening arranged between the first-mentioned viewing opening and the viewer through which the projected image can be viewed with a minimal reduction in brightness and contrast.

* * * * *